(12) United States Patent
Tsujimura et al.

(10) Patent No.: US 11,799,126 B2
(45) Date of Patent: Oct. 24, 2023

(54) METHOD OF PREPARING SOLID ELECTROLYTE AND ALL-SOLID BATTERY INCLUDING SOLID ELECTROLYTE PREPARED BY THE METHOD

(71) Applicant: SAMSUNG ELECTRONICS CO., LTD., Suwon-si (KR)

(72) Inventors: Tomoyuki Tsujimura, Kanagawa (JP); Yuichi Aihara, Kanagawa (JP); Nobuya Machida, Hyogo (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 210 days.

(21) Appl. No.: 16/886,897

(22) Filed: May 29, 2020

(65) Prior Publication Data

US 2020/0381773 A1 Dec. 3, 2020

(30) Foreign Application Priority Data

May 31, 2019 (JP) ................................. 2019-102553
Mar. 31, 2020 (KR) ........................ 10-2020-0039420

(51) Int. Cl.
*H01M 10/0562* (2010.01)
*H01M 10/0569* (2010.01)
(Continued)

(52) U.S. Cl.
CPC ......... *H01M 10/0562* (2013.01); *C01B 17/22* (2013.01); *H01M 4/0471* (2013.01);
(Continued)

(58) Field of Classification Search
None
See application file for complete search history.

(56) References Cited

U.S. PATENT DOCUMENTS 8,075,865 B2 12/2011 Deiseroth et al.
8,697,292 B2 4/2014 Kanno et al.
(Continued)

FOREIGN PATENT DOCUMENTS

JP 2011096630 A 5/2011
JP 2012104279 A 5/2012
(Continued)

OTHER PUBLICATIONS

English Language Machine Translation of JP-2020027781-A retrieved from Espacenet (Year: 2020).*
(Continued)

*Primary Examiner* — Ula C Ruddock
*Assistant Examiner* — Mary Grace Byram
(74) *Attorney, Agent, or Firm* — CANTOR COLBURN LLP (57) ABSTRACT

A method of preparing a solid electrolyte and an all-solid battery including a solid electrolyte prepared by the method, the method including: contacting a first solvent and a first starting material comprising an alkali metal, sulfur, phosphorus, an element M, or a combination thereof to form a first solution; precipitating a first precursor from the first solution; contacting a second solvent, the first precursor, and a second starting material comprising an alkali metal, sulfur, phosphorus, an element M, or a combination thereof to form a second solution; precipitating a second precursor from the second solution; and heat treating the second precursor to prepare the solid electrolyte, wherein the element M comprises an element of Group 14 of the Periodic Table of the Elements, and the element M and the alkali metal in the first starting material and the second starting material are the same or different.

19 Claims, 4 Drawing Sheets

(51) Int. Cl.
*H01M 10/0525* (2010.01)
*H01M 4/38* (2006.01)
*H01M 4/04* (2006.01)
*C01B 17/22* (2006.01)
*H01M 10/052* (2010.01)

(52) U.S. Cl.
CPC ........... *H01M 4/382* (2013.01); *H01M 4/386* (2013.01); *H01M 10/0525* (2013.01); *H01M 10/0569* (2013.01); *C01P 2002/72* (2013.01); *C01P 2002/74* (2013.01); *H01M 10/052* (2013.01); *H01M 2300/0068* (2013.01)

(56) References Cited

U.S. PATENT DOCUMENTS

| | | | |
|---|---|---|---|
| 8,962,194 | B2 | 2/2015 | Senga et al. |
| 8,993,176 | B2 | 3/2015 | Kato et al. |
| 9,263,763 | B2 | 2/2016 | Masaaki et al. |
| 9,484,597 | B2 | 11/2016 | Ohtomo et al. |
| 9,748,602 | B2 | 8/2017 | Osaki et al. |
| 9,748,603 | B2 | 8/2017 | Yamasaki et al. |
| 9,793,574 | B2 | 10/2017 | Seino et al. |
| 9,806,373 | B2 | 10/2017 | Kambara et al. |
| 9,812,734 | B2 | 11/2017 | Miyashita et al. |
| 9,899,701 | B2 | 2/2018 | Miyashita et al. |
| 10,033,065 | B2 | 7/2018 | Kanno et al. |
| 10,290,896 | B2 | 5/2019 | Sung et al. |
| 2011/0081580 | A1 | 4/2011 | Stadler et al. |
| 2015/0093652 | A1* | 4/2015 | Aihara .............. H01M 10/0562 423/303 |
| 2015/0214572 | A1 | 7/2015 | Kato et al. |
| 2016/0149259 | A1 | 5/2016 | Osada et al. |
| 2019/0348707 | A1 | 11/2019 | Seitaro et al. |
| 2020/0020977 | A1* | 1/2020 | Katori .............. H01M 10/0562 |
| 2020/0194825 | A1* | 6/2020 | Katori .............. H01M 10/0562 |

FOREIGN PATENT DOCUMENTS

| | | | |
|---|---|---|---|
| JP | 2013016423 A | 1/2013 | |
| JP | 2013201110 A | 10/2013 | |
| JP | 2014029796 A | 2/2014 | |
| JP | 5527673 B2 | 6/2014 | |
| JP | 2015072783 A | 4/2015 | |
| JP | 2015088226 A | 5/2015 | |
| JP | 2015232965 A | 12/2015 | |
| JP | 201624874 A | 2/2016 | |
| JP | 5957144 B2 | 7/2016 | |
| JP | 6003831 B2 | 10/2016 | |
| JP | 6036996 B2 | 11/2016 | |
| JP | 6259617 B2 | 1/2018 | |
| JP | 2019200856 A | 11/2019 | |
| JP | 2020027781 A | * 2/2020 | |
| KR | 20180055086 A | 5/2018 | |
| WO | 2005078740 A1 | 8/2005 | |
| WO | 2009047254 A1 | 4/2009 | |
| WO | 2012011179 A1 | 1/2012 | |
| WO | 2013069243 A1 | 5/2013 | |
| WO | 2013094757 A1 | 6/2013 | |
| WO | 2013118723 A1 | 8/2013 | |
| WO | 2014041823 A1 | 3/2014 | |
| WO | 2015011937 A1 | 1/2015 | |
| WO | 2015012042 A1 | 1/2015 | |
| WO | 2016009768 A1 | 1/2016 | |
| WO | 2018173939 A1 | 9/2018 | |

OTHER PUBLICATIONS

Miura et al., Liquid-phase syntheses of sulfide electrolytes for all-solid-state lithium battery, Feb. 19, 2019, Nature Reviews Chemistry, 3(3), 189-198 (Year: 2019).*

Satoshi Ujiie et al., "Conductivity of 70Li2S-30P2S5 glasses and glass-ceramics added with lithium halides," Solid State Ionics, 2014, pp. 57-61, vol. 263.

Sylvain Boulineau et al., "Mechanochemical synthesis of Li-argyrodite Li6PS5X (X=CI, Br, I) as sulfur-based solid electrolytes for all solid state batteries application," Solid State Ionics, Jun. 23, 2012, pp. 1-5, vol. 221.

Japanese Office Action for Japanese Patent Application No. 2019-102553 dated Jun. 20, 2023.

* cited by examiner

METHOD OF PREPARING SOLID ELECTROLYTE AND ALL-SOLID BATTERY INCLUDING SOLID ELECTROLYTE PREPARED BY THE METHOD

CROSS-REFERENCE TO RELATED APPLICATIONS

This application claims priority to and the benefit of Japanese Patent Application No. 2019-102553, filed on May 31, 2019, in the Japanese Patent Office and Korean Patent Application No. 10-2020-0039420, filed on Mar. 31, 2020, in the Korean Intellectual Property Office, and all the benefits accruing therefrom under 35 U.S.C. § 119, the contents of which in their entirety are herein incorporated by reference.

BACKGROUND

1. Field

Provided are methods of preparing solid electrolytes used in all-solid batteries.

2. Description of Related Art

As a method of preparing a solid electrolyte used in an all-solid battery, a liquid-phase method of preparing a solid electrolyte by reacting a solid electrolyte component in a solvent to obtain a precipitation of a resulting product may be used.

According to the liquid-phase method, all-solid electrolyte components are dissolved in a single solvent, and then crystals of a resulting product are precipitated therefrom.

The liquid-phase method preparation of a target solid electrolyte may be difficult when a component that is difficult to dissolve in the single solvent is used as a starting material.

In addition to the liquid-phase method, a method of preparing a solid electrolyte may include a solid-phase method of preparing a solid electrolyte by mixing solid electrolyte materials by using a ball mill or the like. Thus there remains a need for an improved method of manufacturing a solid electrolyte.

SUMMARY

Considering the problems above, provided are methods of efficiently preparing solid electrolytes in a case in which a starting material is difficult to dissolve in a solvent.

Additional aspects will be set forth in part in the description which follows and, in part, will be apparent from the description, or may be learned by practice of the presented embodiments of the disclosure.

According to an aspect of an embodiment, a method of preparing a solid electrolyte includes: contacting a first solvent and a first starting material comprising an alkali metal, sulfur, phosphorus, an element M, or a combination thereof form a first solution; precipitating a first precursor from the first solution; contacting a second solvent, the first precursor, and a second starting material comprising an alkali metal, sulfur, phosphorus, an element M, or a combination thereof to form a second solution; precipitating a second precursor from the second solution; and heat treating the second precursor to prepare the solid electrolyte, wherein the element M includes an element of Group 14 of the Periodic Table of the Elements, wherein the element M in the first starting material and the element M in second starting material are the same or different, and wherein the alkali metal in the first starting material and the alkali metal in second starting material are the same or different.

According to a method of preparing a solid electrolyte, a first starting material comprising an alkali metal, sulfur, phosphorus, an element M, or a combination thereof and a second starting material comprising an alkali metal, sulfur, phosphorus, an element M, or a combination thereof may be dissolved on two separate occasions by using at least two types of solvents, e.g., a first solvent and a second solvent, respectively.

In an embodiment, the element M may include germanium, and the first solvent or the second solvent may be ethanol.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A solid electrolyte having a composition that cannot be prepared by a liquid-phase method, may be efficiently prepared by a method disclosed herein.

When a first solvent and a second solvent are different from each other, any suitable material soluble in the first solvent, the second solvent, or the first solvent and the second solvent may be used as a starting material. A solid electrolyte may have a widened spectrum of compositions.

The effects of a method disclosed herein are particularly remarkable when a starting material includes lithium, phosphorus, sulfur, and germanium. While not wanting to be bound by theory, it is understood that germanium may be difficult to dissolve in a solvent in which other elements, such as lithium and phosphorus, may be dissolved. Thus, it may not have been possible to prepare a solid electrolyte using a starting material including germanium by a liquid-phase method. According to a method disclosed herein, a solvent, e.g., the first solvent or the second solvent, in which germanium may be dissolved, may be used, and a solid electrolyte including lithium, phosphorus, sulfur, and germanium, which it may not have been possible to prepare by a liquid-phase method, may be efficiently prepared.

An embodiment will be described in further detail with reference to the drawings.

1. Method of Preparing Solid Electrolyte

Figure 1:
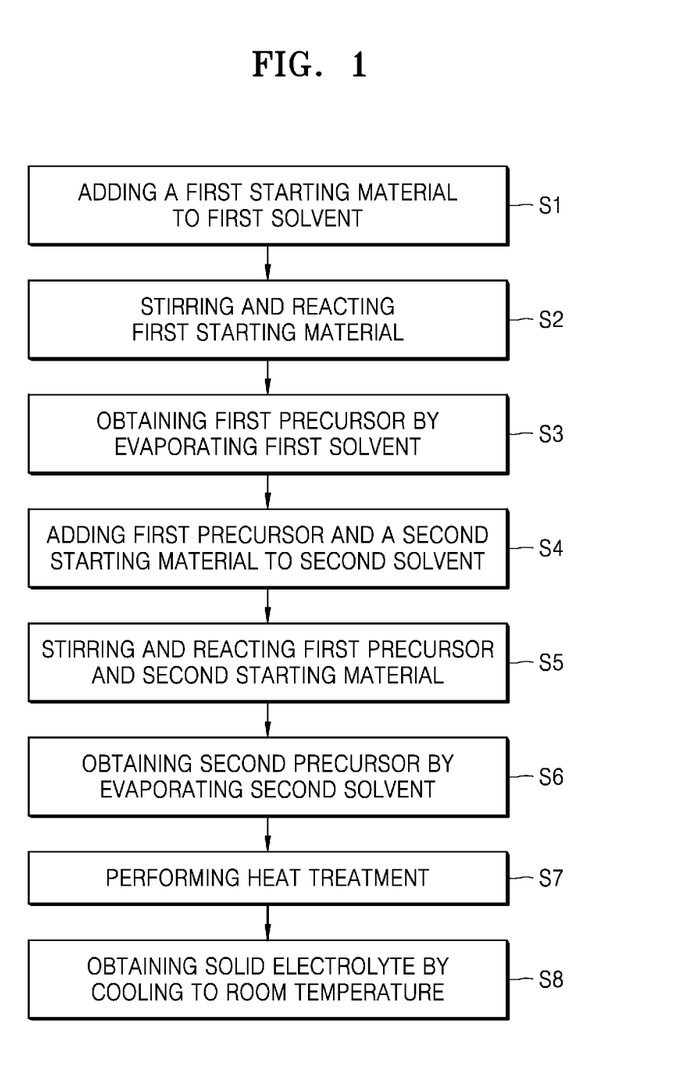
FIG. 1 is a flow chart describing an embodiment of a method of preparing a solid electrolyte.

A process of preparing a solid electrolyte will be described with reference to FIG. 1.

A first starting material is added to a first solvent (S1), e.g., the first solvent and the first starting material are contacted with one another. The first starting materials may be, for example, a mixture of an element M-containing compound and $Li_2S$, and an amount of each is selected based on the stoichiometry of the desired product solid electrolyte. In an aspect, an amount of the M-containing compound and an amount of $Li_2S$ is selected based on an amount of the element M, Li, and S included in a desired in the solid electrolyte product.

A starting material may comprise an alkali metal, sulfur, phosphorus, an element M, or a combination thereof. For example, a starting material may consist of an alkali metal, sulfur, phosphorus, an element M, or a combination thereof.

A starting material may be in any suitable form. A powder form having an average particle size of 1 micrometer (μm) to 1000 μm, e.g., 5 μm to 500 μm, or 10 μm to 100 μm is mentioned.

A sulfide-based solid electrolyte may comprise the element M, lithium, phosphorus, and sulfur. The element M may be difficult to dissolve in a solvent in which an element, such as lithium, phosphorus, sulfur, or the like, is easily dissolved. The element M may include an element of Group 14 of the Periodic Table of the Elements. For example, the element M may include germanium (Ge), tin (Sn), silicon (Si), or a combination thereof.

In an aspect, the disclosed method comprises adding the first starting material to the first solvent, dissolving the first starting material in the first solvent, and then, stirring until a reaction is completed (S2).

The stirring may comprise stirring at 0° C. to 200° C., 10° C. to 150° C., or 20° C. to 100° C. for 1 second to 1 day, 1 minute to 10 hours, or 10 minutes to 1 hour.

The first solvent may comprise a single type or two or more types of a solvent capable of dissolving the starting material. For example, the Gutmann Acceptor Number ($A_N$) of the first solvent may be 10 or greater, e.g., 10 to 100, 15 to 90, 20 to 80, or 25 to 70. The Gutmann $A_N$ is an indicator of acceptor property proposed by Mayer-Guttmann, and indicates a measure of the solvent as a Lewis base, e.g., hydrogen bond acidity. The Gutmann Acceptor Number can be determined by $^{31}$P-NMR. When the $^{31}$P-NMR chemical shift of $(C_2F_5)_3PO$ dissolved in n-hexane is set to be "0" and the $^{31}$P-NMR chemical shift of a $(C_2F_5)_3PO.SbCl_5$ complex in 1,2-chloroethane is set to be "100", the $^{31}$P-NMR chemical shift value of $(C_2F_5)_3PO$ dissolved in a selected solvent is regarded as $A_N$.

For example, the first solvent may be an organic solvent, and may comprise methanol, ethanol, propanol, isopropanol, butanol, acetone, methyl ethyl ketone, butyl acetate, chloroform, acetonitrile, 1,2-dichloroethane, nitroethane, oleic acid, nitrobenzene, benzonitrile, dimethyl sulfoxide, dimethyl acetamide, N-methylformamide, or a combination thereof. In an aspect, the first solvent consists of methanol, ethanol, propanol, isopropanol, butanol, acetone, methyl ethyl ketone, butyl acetate, chloroform, acetonitrile, 1,2-dichloroethane, nitroethane, oleic acid, nitrobenzene, benzonitrile, dimethyl sulfoxide, dimethyl acetamide, or N-methylformamide.

After the starting material is completely dissolved in the first solvent, the first solvent may be removed therefrom, e.g., by using an evaporator or the like, to precipitate a first precursor of a solid electrolyte (S3).

The precipitating the first precursor (S3) may include adding and dissolving the first starting material in the first solvent under an inert atmosphere, followed by stirring for 10 hours or more, e.g., 10 hours to 10 days, 15 hours to 5 days, or 20 hours to 2 days.

The inert atmosphere may comprise an inert gas, and may comprise argon, nitrogen, helium, or a combination thereof, but the inert atmosphere is not limited thereto. Any suitable atmosphere in which the first precursor is neither oxidized nor reduced is applicable, e.g., may be used.

Subsequently, the second starting material is added to the first precursor, so as to complete a final composition of a solid electrolyte, e.g., so that the content of alkali metal, sulfur, phosphorous, and M from the starting material is in accordance with the content of alkali metal, sulfur, phosphorous, and M in the desired product solid electrolyte, and the second solvent is added thereto (S4), e.g., the second starting material, the first precursor, and the second solvent are contacted with one another. The first precursor and the second starting materials may be dissolved in the second solvent, and stirred. In aspect, stirring may continue until a reaction is completed (S5). The first precursor and the remaining second starting material may each be soluble in the second solvent. In this regard, an element M-containing solid electrolyte that previously may have been prepared by a solid-phase method may now be prepared by a liquid-phase method.

The second starting material may include, for example, lithium, phosphorus, sulfur, and the like, or a combination thereof. The second starting material in a powder form is mentioned. In an embodiment, a $Li_2S$ powder and a $P_2S_5$ powder are used.

The second solvent is not particularly limited if the first precursor and the second starting materials are dissolved. The second solvent may be, for example, an organic solvent having a suitable Gutmann Donor Number ($D_N$). The Gutmann Donor Number of the second solvent may be 20 or less, e.g., 1 to 20, 2 to 15, or 3 to 10. The second solvent may comprise nitromethane, carbon tetrachloride, chlorobenzene, cyclohexane, hexane, o-xylene, tetrahydrofuran ("THF"), benzonitrile, 1,4-dioxane, acetonitrile, nitrobenzene, or a combination thereof.

In an embodiment, the element M may be insoluble in one of the first solvent or the second solvent, and may be soluble in the other. A solid electrolyte including the element M may be prepared by a liquid-phase method.

After the reaction is completely finished, the second solvent is removed therefrom, so as to precipitate a second precursor (S6).

The precipitating the second precursor (S6) may include adding and dissolving the first precursor and the second starting material in the second solvent under an inert atmosphere, followed by stirring for days, for example, 5 days or more, e.g., 5 days to 10 days, 6 days to 9 days, or 7 days to 8 days.

The inert atmosphere may include an argon atmosphere or a nitrogen atmosphere, but the inert atmosphere is not limited thereto. Any suitable atmosphere in which the second precursor is neither oxidized nor reduced is applicable, e.g., may be used.

The second precursor thus precipitated is pressed to obtain a pellet. The pellet may be vacuum-sealed inside a quartz glass tube or the like, heat-treated (S7), and cooled to room temperature, so as to obtain a solid electrolyte (S8).

Although not shown in the drawing, prior to the preparation of the pellet, the method may further include performing heat treatment on the second precursor at a temperature in a range of about 500° C. to about 600° C., e.g., about 510° C. to about 590° C., about 520° C. to about 580° C., or about 530° C. to about 570° C. In addition, the heat treatment may be performed in a vacuum atmosphere. In this regard, the residual solvent in the second precursor is removed, and crystallinity and conductivity of the solid electrolyte may be improved.

In an embodiment, the first starting material consists of Li, S, and Ge, and the first solvent may not dissolve Ge. For example, the first solvent may be ethanol or N-methylformamide.

2. Solid Electrolyte Prepared According to an Embodiment and Method of Use Thereof The solid electrolyte thus obtained may be used in a pellet form itself as a solid electrolyte layer of an all-solid secondary battery, or may be pulverized and used in a powder form as a component of a cathode layer, a component of an anode layer, or a component of a solid electrolyte layer of an all-solid secondary battery.

Regarding ionic conductivity at a temperature of 25° C., the solid electrolyte prepared by the method described above may have high ionic conductivity of $10^{-4}$ siemens per centimeter (S/cm) or greater or $10^{-3}$ S/cm or greater, e.g., $10^{-4}$ S/cm to $10^{-1}$ S/cm, or $10^{-3}$ S/cm to $10^{-2}$ S/cm.

In addition, the solid electrolyte prepared by the method described above may be represented by Formula 1:

$$A_{10+x}M_{1+x}P_{2-x}S_{12} \quad \text{Formula 1}$$

wherein, in Formula 1, A includes an element of Group 1 of the Periodic Table of the Elements,
M includes an element of Group 14 of the Periodic Table of the Elements, and $0 \le x < 1$.

In an embodiment, A may include Li, Na, K, or a combination thereof. For example, A may be Li.

In an embodiment, M may include Si, Ge, Sn, or a combination thereof. For example, M may be Ge. For example, M may be a combination of Sn and Si.

In an embodiment, x indicates a molar ratio of the element M, and may satisfy $0 \le x \le 0.5$. For example, x may satisfy $0 \le x < 0.5$ or $0 \le x \le 0.4$. A portion of P may be substituted with the element M as much as x which is an increased molar ratio of the element M. The additional substitution of the element M within the x range above, the ionic conductivity of the solid electrolyte may be improved without causing distortion or deformation of a crystal structure.

In an embodiment, the solid electrolyte may have a peak at positions of 12.3±0.5° 2θ, 14.3±0.5° 2θ, 17.3±0.5° 2θ, 20.1±0.5° 2θ, 20.4±0.5° 2θ, 23.9±0.5° 2θ, 26.8±0.5° 2θ, 29.4±0.5° 2θ, 36.6±0.5° 2θ, 37.6±0.5° 2θ, 40.9±0.5° 2θ, 41.4±0.5° 2θ, 42.2±0.5° 2θ, 47.3±0.5° 2θ, 51.6±0.5° 2θ, and 52.6±0.5° 2θ, when analyzed by X-ray diffraction using Cu Kα radiation.

In an embodiment, the solid electrolyte may include an argyrodite crystal phase, and may further include other crystal phases. Such a crystal phase of the solid electrolyte may be identified through X-ray diffraction peaks measured in Examples described below.

According to the method of preparing the solid electrolyte as described above, the starting material is dissolved on two separate occasions in the first solvent and the second solvent, respectively. In this regard, as compared to a liquid-phase method using one type of solvent, types of the starting material available may be significantly increased.

When the element M (e.g., Ge, Sn, Si, or the like), which is not easily dissolved in an organic solvent in which an element (e.g., Li, P, S, or the like) included in a sulfide-based solid electrolyte is dissolved, is used, a liquid-phase method may be used with a solvent that easily dissolves the element M (e.g., Ge, Sn, Si, or the like) in the first solvent or the second solvent, wherein the first solvent and the second solvent are different from each other.

When such a liquid-phase method is used, a solid electrolyte may be prepared on a much larger scale than a solid electrolyte prepared by a solid-phase method including mixing powders using a ball mill or the like. Thus, the productivity of a solid electrolyte having a composition prepared by a solid-phase method rather than a liquid-phase method may be significantly improved.

The solid electrolyte thus obtained by the liquid-phase method disclosed herein is a sulfide-based solid electrolyte including elements, such as Li, P, and S, and the ionic conductivity of the solid electrolyte may be improved. In addition, such a sulfide-based solid electrolyte includes an element of Group 14, such as Ge, Sn, Si, or the like, and the ionic conductivity of the solid electrolyte may be further improved.

The disclosed method is not limited to an embodiment described above.

For example, in an embodiment described above, the element M as a starting material may be dissolved in the first solvent, which is a different type from a solvent that easily dissolves Li, P, S, or the like. In an embodiment, the element M as a starting material may be dissolved in the second solvent.

The first solvent and the second solvent are not particularly limited, and various types of the solvent may be used depending on elements to be dissolved therein.

In addition, depending on a desired configuration, other solvents, such as a third solvent and a fourth solvent, may be used in addition to the first solvent and the second solvent, so as to obtain a third precursor and a fourth precursor. Furthermore, the liquid-phase method disclosed herein may be a multi-step liquid-phase method.

Since the solid electrolyte prepared by the method disclosed herein has high ionic conductivity at room temperature as compared with a solid electrolyte prepared by other methods, the solid electrolyte prepared by the method disclosed herein may be a sulfide-based solid electrolyte including an element of Group 14. The solid electrolyte prepared by the method disclosed herein may be also used to prepare solid electrolytes other than the sulfide-based solid electrolyte. The configuration of the solid electrolyte is not particularly limited, and may be modified to various configurations.

The first solvent and the second solvent are not particularly limited, and may include solvents capable of dissolving elements included in the starting material of the solid electrolyte. In an embodiment, the first solvent and the second solvent may each be a combination of various types of solvents. The first solvent and the second solvent may be identical to or different from each other. When the same solvents are used, the raw material may be dissolved through multiple dissolution steps.

3. Configuration of all-Solid Secondary Battery

Figure 7:
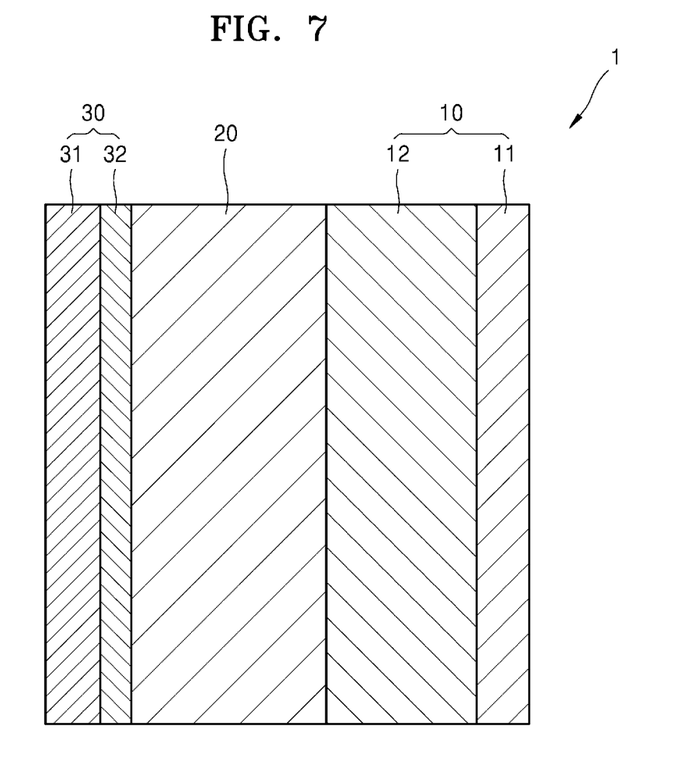
FIG. 7 is a schematic diagram of an embodiment of an all-solid secondary battery including a solid electrolyte.

Next, referring to FIG. 7, the configuration of an all-solid secondary battery 1 according to an embodiment will be described. FIG. 7 is a schematic cross-sectional diagram of a layered configuration of an all-solid secondary battery according to an embodiment. The all-solid secondary battery 1 uses a solid electrolyte material as an electrolyte. In addition, the all-solid secondary battery 1 may be a so-called all-solid lithium-ion secondary battery in which lithium ions move between a cathode layer 10 and an anode layer 30.

As shown in FIG. 7, the all-solid secondary battery 1 includes a cathode layer 10, a solid electrolyte layer 20, and an anode layer 30. In addition, in an embodiment, the cathode layer 10, the solid electrolyte layer 20, the anode layer 30, or a combination thereof may include a solid electrolyte material prepared by the method described above.

Cathode Layer

The cathode layer 10 may include a cathode current collector 11 and a cathode active material layer 12 The cathode current collector 11 may be, for example, a plate-shaped body, a thin-film, or the like, each including, e.g., consisting, of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The cathode current collector 11 may be omitted in the configuration.

The cathode active material layer 12 may be disposed between the cathode current collector 11 and the solid electrolyte layer 20 to be in contact therewith. The cathode active material layer 12 may include at least a cathode active material, and may further include a conductive agent to supplement electronic conductivity and a solid electrolyte material to supplement ionic conductivity.

For use as a cathode active material, any suitable cathode active material capable of reversibly intercalating and deintercalating lithium ions may be used.

For example, the cathode active material may include a complex oxide of lithium and metal, wherein the metal includes Co, manganese (Mn), Ni, or a combination thereof. For example, the cathode active material may be a compound represented by: $Li_aA_{1-b}B^1{}_bD^1{}_2$ (wherein $0.90 \leq a \leq 1.8$ and $0 \leq b \leq 0.5$); $Li_aE_{1-b}B^1{}_bO_{2-c}D^1{}_c$ (wherein $0.90 \leq a \leq 1.8$, $0 \leq b \leq 0.5$, and $0 \leq c \leq 0.05$); $Li_aE_{2-b}B^1{}_bO_{4-c}D^1{}_c$ (wherein $0 \leq b \leq 0.5$ and $0 \leq c \leq 0.05$); $Li_aNi_{1-b-c}Co_bB^1{}_cD^1{}_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cD^1{}_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB^1{}_cO_{2-\alpha}F^1{}_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $L_2O_5$; $LiV_2O_5$; $LiI^1O_2$; $LNiVO_4$; $Li_{(3-f)}J_2(PO_4)_3$ (wherein $\leq f \leq 2$); $Li_{(3-f)}Fe_2(PO_4)_3$ (wherein $0 \leq f \leq 2$); $LiFePO_4$, or a combination thereof.

In the formulae above, A is Ni, Co, Mn, or a combination thereof; $B^1$ is Al, Ni, Co, Mn, Cr, Fe, Mg, Sr, V, a rare-earth element, or a combination thereof; $D^1$ is O, F, S, P, or a combination thereof; E is Co, Mn, or a combination thereof; $F^1$ is F, S, P, or a combination thereof; G is Al, Cr, Mn, Fe, Mg, La, Ce, Sr, V, or a combination thereof; Q is Ti, Mo, Mn, or a combination thereof; $I^1$ is Cr, V, Fe, Sc, Y, or a combination thereof; and J is V, Cr, Mn, Co, Ni, Cu, or a combination thereof.

For example, the cathode active material may be formed by using a lithium salt, such as lithium cobalt oxide ("LCO"), lithium nickel oxide, lithium nickel cobalt oxide, lithium nickel cobalt aluminum oxide ("NCA"), lithium nickel cobalt manganese oxide ("NCM"), lithium manganese oxide, and lithium iron phosphate, nickel sulfide, copper sulfide, sulfur (monosulfur), a sulfur compound, iron oxide, vanadium oxide, or a combination thereof. Two or more cathode active materials may be used.

In addition, the cathode active material may be formed of, among the above-mentioned lithium salts, a lithium salt of a transition metal oxide having a layered rock salt structure. For example, such a lithium salt may include Li and Ni, Co, Mn, Al, or a combination thereof, and may have a layered rock salt structure. The term "layered" as used herein refers to a thin sheet-like shape. In addition, the term "rock salt structure" as used herein refers to a structure of sodium chloride as one type of a crystal structure. In detail, the rock salt structure refers to a structure in which face-centered cubic lattices of cations with anions are arrayed cornerwise at a ½ point of the edges of unit lattices of cations and anions.

The lithium salt of a transition metal oxide having such a layered rock salt structure may include, for example, a lithium salt of a ternary transition metal oxide, such as $LiNi_xCo_yAl_zO_2$ ("NCA") or $LiNi_xCo_yMn_zO_2$("NCM") (wherein, in the formulae, $0<x<1, 0<y<1, 0<z<1$, $x+y+z=1$, $0<x'<1, 0<y'<1, 0<z'<1$, and $x'+y'+z'=1$).

When the cathode active material includes the lithium salt of the transition metal having the layered rock salt structure, a relatively high charge voltage may be obtained, and energy density and thermal stability of the all-solid secondary battery 1 may be improved.

The cathode active material may be covered with a coating layer. For use as a coating layer according to an embodiment, any suitable material for use as a coating layer of a cathode active material of an all-solid secondary battery may be used. An example of the coating layer includes $Li_2O$—$ZrO_2$ or the like.

In addition, when the cathode active material includes Ni which is formed as a lithium salt of a ternary transition metal oxide, such as NCA or NCM, the capacity density of the all-solid secondary battery 1 may be increased, and metal exudation from the cathode active material in a charged state may be reduced. In this regard, the all-solid secondary battery 1 according to an embodiment may have improved long-term reliability and improved cycle characteristics in a charged state.

In addition, the cathode active material may include sulfur, a sulfur compound, which may be able to increase specific capacity compared to an oxide-based cathode active material (for example, sulfur has specific capacity of 1,600 milliampere hours per gram (mAh/g)). The sulfur compound may include, for example, $Li_2S$, transition metal sulfide, a sulfur-containing polymer material, or the like.

A shape of the cathode active material may be, for example, a particle shape, such as a spherical shape or an elliptic spherical shape. In addition, a particle diameter of the cathode active material is not particularly limited, and may be in a range applicable to a cathode active material of an all-solid secondary battery. In addition, an amount of the cathode active material in the cathode active material layer 12 is not particularly limited, and may be in a range applicable to a cathode active material layer of an all-solid secondary battery.

Furthermore, a solid electrolyte material included in the cathode active material layer 12 may be or may not be the same as the solid electrolyte material included in the solid electrolyte layer 20. Details of the solid electrolyte material will be described in the description of the solid electrolyte layer 20.

In addition, the cathode active material layer 12 may include additives, for example, a conductive agent, a binder, a filler, a dispersant, an ion conductive agent, and the like, or a combination thereof, which are appropriately blended with the cathode active material layer and the solid electrolyte material.

A conductive agent blendable in the cathode active material layer 12 may include, for example, graphite, carbon black, acetylene black, ketjen black, carbon fiber, carbon nanofiber, metal powder, or the like. In addition, a binder blendable in the cathode active material layer may include, for example, styrene-butadiene rubber ("SBR"), polytetrafluoroethylene, polyvinylidene fluoride, polyethylene, or the like. In addition, for use as a filler, a dispersant, an ion conductive agent, or the like, which is blendable in the cathode active material layer 12, any suitable material for use for an electrode of an all-solid secondary battery may be used.

Solid Electrolyte Layer

The solid electrolyte layer 20 may be disposed between the cathode layer 10 and the anode layer 30, and may include the solid electrolyte material prepared by the method disclosed herein. In addition, the cathode layer 10, the anode layer 30, the solid electrolyte layer 20, or a combination thereof in the all-solid secondary battery 1 may include the solid electrolyte material prepared by the method disclosed herein.

The solid electrolyte layer 20 may further include, in addition to the solid electrolyte material prepared by the method disclosed herein, a second solid electrolyte material. The second solid electrolyte material may have, for example, a composition of the following formulae: $Li_2S$—$P_2S_5$, $Li_2S$—$P_2S_5$—LiX (wherein X is a halogen atom, such as I or Cl), $Li_2S$—$P_2S_5$—$Li_2O$, $Li_2S$—$P_2S_5$—$Li_2O$—LiI, $Li_2S$—$SiS_2$, $Li_2S$—, $SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$-ZmSn (wherein m and n are each an integer, and Z is Ge, Zn, or Ga), $Li_2S$—$GeS_2$, $Li_2S$—$SiS_2$—$Li_3PO_4$, $Li_2S$—$SiS_2$—$Li_pMo_q$ (wherein p and q are each an integer, and M is P, Si, Ge, B, Al, Ga, or In). The solid electrolyte material may be prepared by treating a starting material (e.g., $Li_2S$, $P_2S_5$, or the like) by a melt quenching method or a mechanical milling method, or may be prepared by the same method as the method of preparing the solid electrolyte disclosed herein. In addition, heat treatment may be performed thereafter. The second solid electrolyte material thus prepared may be amorphous or crystalline, or may be in a mixed phase state.

In addition, regarding the second solid electrolyte material, a material including sulfur and Si, P, boron (B), or a combination thereof may be used as the second solid electrolyte material. The solid electrolyte layer 20 may have further improved lithium conductivity, and battery characteristics of the all-solid secondary battery 1 may be improved. In addition, as the second solid electrolyte material, a material including S, P, and Li, e.g., a material consisting of S, P, and Li, for example, $Li_2S$—$P_2S_5$, may be used.

When $Li_2S$—$P_2S_5$ is used as the second solid electrolyte material, a mixed molar ratio of $Li_2S$ to $P_2S_5$ ($Li_2S:P_2S_5$) may be, for example, in a range of 50:50 to 90:10.

In addition, when the solid electrolyte layer 20 includes solid electrolyte material A and the second solid electrolyte material, an amount of the solid electrolyte material according to an embodiment may be in a range of about 10 weight % to about 99 weight %, based on the total weight of the solid electrolyte layer 20.

In addition, when the cathode layer 10 or the anode layer 30 includes a solid electrolyte material, the solid electrolyte layer 20 may not include a solid electrolyte material.

In addition, the solid electrolyte layer 20 may further include a binder. Examples of the binder included in the solid electrolyte layer 20 include SBR, polytetrafluoroethylene, polyvinylidene fluoride, polyethylene oxide, and the like, or a combination thereof. The binder included in the solid electrolyte layer 20 may be identical to or different from the binder included in the cathode active material layer 12.

Anode Layer

In an embodiment as shown in FIG. 7, the anode layer 30 includes an anode current collector 31 and an anode active material layer 32 disposed between the anode current collector 31 and the solid electrolyte layer 20. A material constituting the anode current collector 31 may include, for example, In, Cu, Mg, stainless steel, Ti, Fe, Co, Ni, Zn, Al, Ge, and the like, or a combination thereof. The anode current collector 31 include one of these metals, an alloy of two or more metals, or a combination thereof, e.g., the anode current collector 31 may consist of one of these metals an alloy of two or more metals. The anode current collector 31 may be, for example, a plate-shaped body or a thin-film.

In addition, as an anode active material in the anode active material layer 32, a material forming an alloy with lithium or a compound with lithium may be used, and when a capacity of an anode active material is smaller than that of the cathode active material in the cathode active material layer 12, the anode current collector 31 may be formed of a material that does not react with lithium, i.e., a material that does not form an alloy with lithium nor a compound with lithium. Such a material may be, for example, Cu, Mg, stainless steel, Ti, Fe, Co, Ni, Ge, or the like.

The anode active material layer 32 may be disposed between the anode current collector 31 and the solid electrolyte layer 20 to be in contact therewith. The anode active material layer 32 may include an anode active material forming an alloy with lithium or a compound with lithium. In addition, when the anode active material layer 32 includes such an anode active material in an embodiment, lithium metal may be deposited on the anode active material layer 32 as follows.

First, at the initial stage of charging, an anode active material, which forms an alloy with lithium or a compound with lithium in the anode active material layer 32, forms an alloy with lithium or a compound with lithium, and lithium may be intercalated in the anode active material layer 32. Then, after exceeding the capacity of the anode active material layer 32, lithium metal may be deposited on one surface or both surfaces of the anode active material layer 32. The lithium metal thus deposited forms a metal layer. Since the lithium metal is formed by diffusion of the anode active material capable of forming an alloy with lithium or a compound with lithium, the lithium metal is formed uniformly along the surface of the anode active material layer 32 rather than being a water phase (e.g., dendrite phase). During discharge, the lithium metal in the anode active material layer 32 and the metal layer is ionized and moves to the cathode layer 10. Thus, lithium may be used as the anode active material, and energy density may be improved.

Furthermore, when the metal layer is formed between the anode active material layer 32 and the anode current collector 31, the anode active material layer 32 may coat the metal layer. In this regard, the anode active material layer 32 may function as a protective layer of the metal layer. A possibility of short circuit, capacity reduction, or a combination thereof of the all-solid secondary battery 1 may be reduced or prevented, and furthermore, the characteristics of the all-solid secondary battery 1 may be improved.

To enable the deposition of the lithium metal in the anode active material layer 32, the charging capacity of the cathode active material layer 12 may be set to be greater than that of the anode active material layer 32. In detail, a ratio (relative to the capacity) of charging capacity a (milliampere hours (mAh)) of the cathode active material layer 12 (cathode layer 10) and charging capacity b (mAh) of the anode active material layer 32 may satisfy the relationship of Formula (I):

$$0.002 < b/a < 0.5 \qquad (I).$$

When the capacity ratio represented by Formula (I) above is 0.002 or less, depending on the configuration of the anode active material layer 32, the characteristics of the all-solid secondary battery 1 may be deteriorated. While not wanting to be bound by theory, it is understood that the anode active material layer 32 fails to sufficiently mediate the deposition of the lithium metal from the lithium ions, and that the formation of the metal layer is not appropriately performed. In this case, the anode active material layer 32 may collapse due to the repeated charging and discharging, and dendrites may deposit and grow. Consequently, the characteristics of the all-solid secondary battery 1 may be deteriorated. In addition, when the metal layer is formed between the anode active material layer 32 and the anode current collector 31, the anode active material layer 32 may not consequently function as a protective layer. In this regard, the capacity ratio may be 0.005 or more, or 0.01 or more.

In addition, when the capacity ratio is 0.5 or more, the anode active material layer 32 may store most of lithium during charge, and depending on the configuration of the anode active material layer 32, the metal layer may not be sufficiently formed. In this case, the capacity ratio may be 0.1 or less, or 0.04 or less. In an embodiment, the capacity ratio may be in a range of 0.005 to 0.1, 0.006 to 0.09, 0.007 to 0.08, 0.008 to 0.07, 0.009 to 0.06, or 0.01 to 0.04.

To realize the above-mentioned functions, the anode active material may be, for example, amorphous carbon, gold, platinum, palladium (Pd), silicon (Si), silver (Ag), aluminum (Al), bismuth (Bi), tin (Sn), antimony (Sb), zinc (Zn), and the like, or a combination thereof. Examples of amorphous carbon include carbon black (e.g., acetylene black, furnace black, ketjen black, and the like, or a combination thereof), graphene, and the like, or a combination thereof.

A shape of the anode active material is not particularly limited, and may be granular. For example, the anode active material may be able to form a uniform layer, such as a plating layer. In the case of the anode active material in granular form, lithium ions may pass through a gap between granular anode active materials to form a lithium metal layer between the anode active material layer 32 and the anode current collector 31. In the case of the anode active material in a uniform layer, a metal layer may be deposited between the anode active material layer 32 and the solid electrolyte layer 20.

Among the description above, the anode active material layer 32 may include a mixture of amorphous carbon including amorphous carbon having a low specific surface area of 100 square meters per gram ($m^2/g$) or less, e.g., 1 to 100 $m^2/g$, 5 to 80 $m^2/g$, or 10 to 90 $m^2/g$, and amorphous carbon having a high specific surface area of 300 $m^2/g$ or greater, e.g., 300 to 1,000 $m^2/g$, 400 to 900 $m^2/g$, or 500 to 800 $m^2/g$, wherein each specific surface area is measured by a nitrogen gas adsorption method.

The anode active material 32 may include one type or two or more types of the anode active material. For example, the anode active material layer 32 may include, as the anode active material, amorphous carbon or Au, Pt, Pd, Si, Ag, Al, Bi, Sn, Sb, Zn, or a combination thereof. In addition, the anode active material layer 32 may include a mixture of amorphous carbon and Au, Pt, Pd, Si, Au, Al, Bi, Sn, Sb, Zn, or a combination thereof. A mixing ratio (i.e., a weight ratio) of amorphous carbon to metal (e.g., Au) may be in a range of 1:1 to 1:3. When the anode active material is formed of the materials above, the characteristics of the all-solid secondary battery 1 may be further improved.

When the anode active material is formed of amorphous carbon and Au, Pt, Sb, Si, Ag, Al, Bi, Sn, Zn, or a combination thereof, the anode active material may have a particle diameter of 4 micrometers (μm) or less. In this case, the characteristics of the all-solid secondary battery 1 may be further improved. The particle diameter of the anode active material may be obtained by, for example, an electron microscopic image (e.g., a scanning electron microscopic image) in a way that a circle diameter for each anode active material is calculated to obtain an arithmetic mean value. The particle diameter of the anode active material may be a median value (so-called $D_{50}$) based on a volume standard obtained by a laser diffraction particle size distribution system. Such a median value may approximately correspond to the arithmetic mean value calculated from the electron microscopic image. A lower limit of the particle diameter is not particularly, but may be, for example, 0.01 μm or greater. In an embodiment, the particle diameter may be in a range of 0.01 μm to 4 μm, 0.05 μm to 3 μm, or 0.1 μm to 2 μm.

In addition, when the anode active material includes a material capable of forming an alloy with lithium, such as Au, Pt, Pd, Sb, Si, Ag, Al, Bi, Sn, Zn, or a combination thereof, the anode active material layer 32 may be a metal layer. For example, the metal layer may be a plating layer.

The charging capacity of the cathode active material layer 12 may be obtained by multiplying charging capacity density (mAh/g) of the cathode active material by weight of the cathode active material in the cathode active material layer 12. When different types of the cathode active material are used, charging capacity density x weight values for each cathode active material are calculated, and the sum of the values is regarded as the charging capacity of the cathode active material layer 12. A charging capacity of the anode active material layer 32 is also calculated in the same way. That is, the charging capacity of the anode active material layer 32 may be obtained by multiplying charging capacity density (mAh/g) of the anode active material by weight of the anode active material in the anode active material layer 32. When different types of the anode active material are used, charging capacity density x mass values for each anode active material are calculated, and the sum of the values is regarded as the charging capacity of the anode active material layer 32. The charging capacity density of the cathode active material and the anode active material refer to a capacity estimated by using an all-solid half-cell using lithium metal as a counter electrode. In practice, based on the measurement using an all-solid half-cell, the charging capacity of the cathode active material layer 12 and the anode active material layer 32 may be directly measured. When the charging capacity thus measured is regarded as the weight of each active material, the charging capacity density is calculated.

Furthermore, the anode active material layer 32 may include a binder as desired. Examples of the binder include SBR, polytetrafluoroethylene, polyvinylidene fluoride, polyethylene, and the like, or a combination thereof. The binder may be composed of one type or two or more types. When anode active material layer 32 includes the binder, a possibility of deintercalation of the anode active material may be reduced or prevented, especially when the anode active material is in granular form. When the anode active material layer 32 includes the binder, an amount of the binder may be, for example, in a range of about 0.3 weight % to about 20 weight %, 1.0 weight % to about 15 weight %, or about 3.0 weight % to about 15 weight %, based on the total weight of the anode active material layer 32.

In addition, additives, e.g., a filler, a dispersant, an ion conductive agent, and the like, or a combination thereof that may be used in an all-solid secondary battery may be appropriately blended in the anode active material layer 32.

A thickness of the anode active material layer 32 is not particularly limited when the anode active material is in granular form, but may be in a range of about 1.0 μm to about 20 μm or about 1.0 μm to about 10 μm. The anode active material layer 32 may reduce the resistance value of the anode active material layer 32 while obtaining the above-described effects of the anode active material layer 32, and characteristics of the all-solid secondary battery 1 may be improved.

A thickness of the anode active material 32 may be, for example, in a range of about 1.0 nanometers (nm) to about 100 nm, when the anode active material is in the uniform layer form. In this case, an upper limit of the thickness of the anode active material layer 32 may be 95 nm, 90 nm, or 50 nm. In an embodiment, a lower limit of the thickness of the anode active material layer 32 be 1.0 μm, 5.0 μm, or 10.0 μm.

In addition, in an embodiment, the anode active material layer 32 may be formed of a material that does not include lithium. For example, the anode active material layer 32 in the anode layer 30 may not include lithium. In an embodiment, a content per unit area of elemental lithium included in the anode active material layer 32 of the anode layer 30 is reduced, and may be greater than 0 weight % and 5 weight % or less, or greater than 0 weight % and 2 weight % or less, based on the content per unit area of lithium, e.g., lithium element, included in the cathode active material of the cathode active material layer.

In addition, the anode active material layer 32 is not limited to the above-mentioned configuration. For example, the anode active material layer 32 may adopt, e.g., include or take the form of, any suitable configuration applicable as an anode active material layer of an all-solid secondary battery.

For example, the anode active material layer 32 may include an anode active material, a solid electrolyte material, and an anode layer conductive agent.

In this case, for example, a metal active material or a carbon active material may be used as an anode active material. The metal active material may include, for example, a metal, such as Li, In, Al, Sn, Si, an alloy thereof, or a combination thereof. In addition, the carbon active material may include, for example, artificial graphite, graphite carbon fiber, resin-sintered carbon, vapor-deposited pyrolytic carbon, coke, mesocarbon microbead ("MCMB"), furfuryl alcohol, resin-sintered carbon, polyacene, pitch-based carbon fiber, vapor-deposited carbon fiber, natural graphite, hard carbon, and the like, or a combination thereof. Two or more anode active materials may be used.

Hereinafter, the present disclosure will be described in more detail with reference to Examples and Comparative Examples. However, the following Examples are set forth to illustrate a technical idea, and the scope of the present disclosure is not limited to these Examples.

EXAMPLES

Example 1

Preparation of Solid Electrolyte

In a glove box of which the atmosphere was replaced with argon (Ar) gas, $Li_2S$ (purity: 99.9%, MizunoJapan) and $GeS_2$ (purity: 99.9% Wako Pure Chemical) were used to prepare 1.5 grams (g) of a powder having a composition of $2Li_2S \cdot GeS_2$. In a 50 milliliter (mL) beaker, 40 mL of ethanol was prepared as a first solvent. The prepared powder was then added and dissolved in ethanol, and the mixed solution was stirred overnight. After completion of the reaction, ethanol was distilled at a temperature of 80° C. under reduced pressure by using a rotary evaporator, so as to obtain a first precursor. Subsequently, $Li_2S$ (purity: 99.9%, Mizuno Japan) and $P_2S_5$ (purity: 99%, Aldrich) were added to the first precursor so that a final composition thereof was $Li_{10}GeP_2S_{12}$, and 40 mL of tetrahydrofuran ("THF") was added thereto as a second solvent. The mixed solution was then stirred in an Ar atmosphere. After completion of the reaction, THF was completely removed therefrom at a temperature of 80° C. under reduced pressure by using a rotary evaporator, so as to obtain a second precursor. 150 milligrams (mg) of the second precursor thus obtained was pressed at a pressure of 380 megapascals (MPa), so as to prepare a pellet. A quartz glass tube was then vacuum sealed with the pellet, and heat treatment was performed thereon. The heat treatment was performed at a temperature of 550° C. for 4 hours. The heat-treated pellet was cooled to room temperature, so as to obtain a solid electrolyte.

Evaluation of Solid Electrolyte

The ionic conductivity of the solid electrolyte thus obtained was measured.

For the measurement of the ionic conductivity, indium foil was compressed on both sides of the solid electrolyte of the pellet obtained by the above-mentioned method, so as to prepare a testing pellet. In addition, the ionic conductivity of the testing pellet was measured while changing the measurement temperature from 17° C. to 140° C., and the activation energy was obtained according to the Arrhenius Equation. In addition, a finally obtained powder was evaluated for material crystallinity by using a powder X-ray diffraction apparatus.

Figure 2:
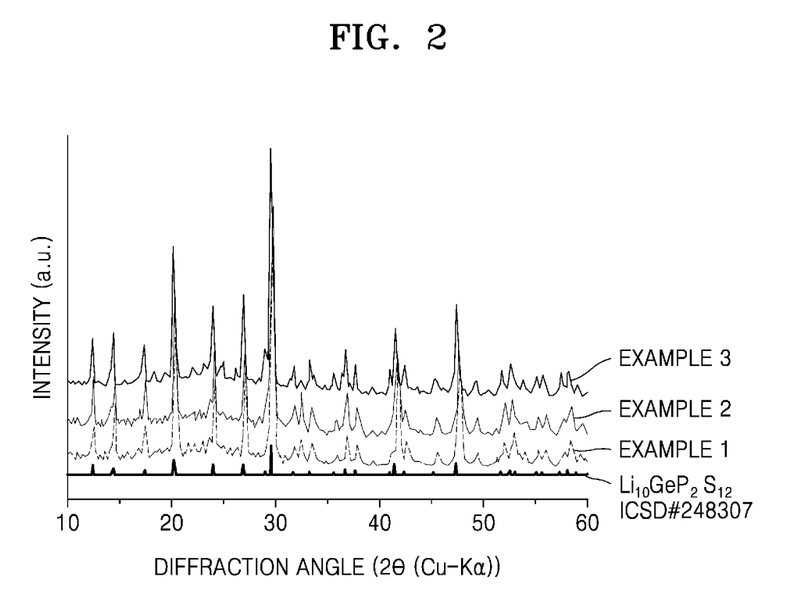
FIG. 2 is a graph of intensity (arbitrary units (a.u.)) versus diffraction angle (degrees two-theta) ($2\theta°$), which shows the results of X-ray diffraction analysis of solid electrolytes prepared in Example 1, Example 2, and Example 3, and a pattern for a reference $Li_{10}GeP_2S_{12}$ (Inorganic Crystal Structure Database ("ICSD") #248307), when analyzed using Cu Kα radiation.

The X-ray diffraction ("XRD") pattern of the solid electrolyte prepared in Example 1 is shown in FIG. 2. As a result of comparing the XRD pattern of the solid electrolyte of Example 1 with that of a reference $Li_{10}GeP_2S_{12}$ (Inorganic Crystal Structure Database ("ICSD") #248307), it was confirmed that a target $Li_{10}GeP_2S_{12}$ crystal was formed. In detail, it was confirmed that a crystalline $Li_{10}GeP_2S_{12}$ solid electrolyte having a peak at positions of 12.3±0.5° 2θ, 14.3±0.5° 2θ, 17.3±0.5° 2θ, 20.1±0.5° 2θ, 20.4±0.5° 2θ, 23.9±0.5° 2θ, 26.8±0.5° 2θ, 29.4±0.5° 2θ, 36.6±0.5° 2θ, 37.6±0.5° 2θ, 40.9±0.5° 2θ, 41.4±0.5° 2θ, 42.2±0.5° 2θ, 47.3±0.5° 2θ, 51.6±0.5° 2θ, and 52.6±0.5° 2θ, analyzed by XRD using Cu Kα radiation, was obtained. In addition, the solid electrolyte of Example 1 had an ionic conductivity of $4.5 \times 10^{-4}$ siemens per centimeter (S/cm) at a temperature of 25° C. and the activation energy of 27 kilojoules per mole (kJ/mol).

Example 2

A solid electrolyte was prepared in the same manner as in Example 1, except that the heat treatment conditions performed on the pellet were changed to 550° C. and 14 hours. FIG. 2 shows the X-ray powder diffraction pattern of the finally obtained solid electrolyte. It was confirmed in FIG. 2 that a desired $Li_{10}GeP_2S_{12}$ crystal was formed. In addition, the measured ionic conductivity was $3.1 \times 10^{-3}$ S/cm at a temperature of 25° C., and the measured activation energy was 26 kJ/mol.

Example 3

A solid electrolyte was prepared in the same manner as in Example 1, except that the heat treatment conditions performed on the pellet were changed to 550° C. and 24 hours. FIG. 2 shows the X-ray powder diffraction pattern of the finally obtained solid electrolyte. It was confirmed in FIG. 2 that a desired $Li_{10}GeP_2S_{12}$ crystal was formed. In addition, the measured ionic conductivity was $4.5 \times 10^{-3}$ S/cm at a temperature of 25° C., and the measured activation energy was 26 kJ/mol.

Example 4

In a glove box of which the atmosphere was replaced with Ar gas, $Li_2S$ (purity: 99.9%, Mizuno Japan) and $GeS_2$ (purity: 99.9% Wako Pure Chemical) were used to prepare 1.5 g of a powder having a composition of $2Li_2S \cdot GeS_2$. In a 50 mL beaker, 40 mL of N-methylformamide ("NMF") was prepared as a first solvent. The prepared powder was then added and dissolved in ethanol, and the mixed solution was stirred overnight. After completion of the reaction, NMF was distilled at a temperature of 250° C. under reduced pressure by using a rotary evaporator, so as to obtain a first precursor. Subsequently, $Li_2S$ (purity: 99.9%, Mizuno Japan) and $P_2S_5$ (purity: 99%, Aldrich) were added to the first precursor so that a final composition thereof was $Li_{10}GeP_2S_{12}$, and THF was added thereto as a second solvent. The mixed solution was then stirred in an Ar atmosphere. After completion of the reaction, THF was completely removed at a temperature of 80° C. under reduced pressure by using a rotary evaporator, so as to obtain a second precursor. In addition, 150 mg of the second precursor thus obtained was pressed at a pressure of 380 MPa, so as to prepare a pellet. A quartz glass tube was then vacuum sealed with the pellet, and heat treatment was performed thereon. The heat treatment was performed at a temperature of 550° C. for 4 hours. Following the heat treatment, the resulting pellet was cooled to room temperature, so as to obtain a solid electrolyte.

Figure 3:
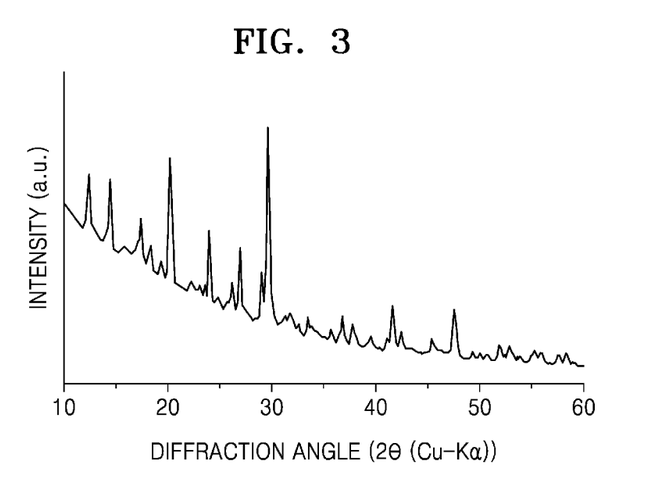
FIG. 3 is a graph of intensity (a.u.) versus diffraction angle ($2\theta°$) using Cu Kα radiation, which shows the results of X-ray diffraction analysis of a solid electrolyte prepared in Example 4, when analyzed using Cu Kα radiation.

FIG. 3 shows the X-ray powder diffraction pattern of the finally obtained solid electrolyte. It was confirmed in FIG. 3 that a desired $Li_{10}GeP_2S_{12}$ crystal was formed. In addition, the measured ionic conductivity was $1.1 \times 10^{-3}$ S/cm at a temperature of 25° C., and the measured activation energy was 27 kJ/mol.

Example 5

In a glove box of which the atmosphere was replaced with Ar gas, $Li_2S$ (purity: 99.9%, Mizuno Japan), $SiS_2$ (purity: 99.9% Wako Pure Chemical), and $SnS_2$ (purity: 99.9% Wako Pure Chemical) were used to prepare 0.5 g of a powder having a composition of $2.7Li_2S \cdot 1.08SiS_2 \cdot 0.27SnS_2$. In a 40 mL beaker, 40 mL of ethanol was prepared as a first solvent. The prepared powder was added and dissolved in ethanol, and the mixed solution was stirred overnight. After completion of the reaction, ethanol was distilled at a temperature of 80° C. under reduced pressure by using a rotary evaporator, so as to obtain a first precursor. Subsequently, $Li_2S$ (purity: 99.9%, Mizuno Japan) and $P_2S_5$ (purity: 99%, Aldrich) were added to the first precursor so that a final composition thereof was $Li_{10.35}Sn_{0.27}Si_{1.08}P_{1.65}S_{12}$, and 40 mL of THF was added thereto as a second solvent. The mixed solution was then stirred in an Ar atmosphere. After completion of the reaction, THF was completely removed at a temperature of 80° C. under reduced pressure by using a rotary evaporator, so as to obtain a second precursor. 150 mg of the second precursor thus obtained was pressed at a pressure of 380 MPa, so as to prepare a pellet. A quartz glass tube was then vacuum sealed with the pellet, and heat treatment was performed thereon. The heat treatment was performed at a temperature of 550° C. for 24 hours. Following the heat treatment, the resulting pellet was cooled to room temperature, so as to obtain a solid electrolyte.

Figure 4:
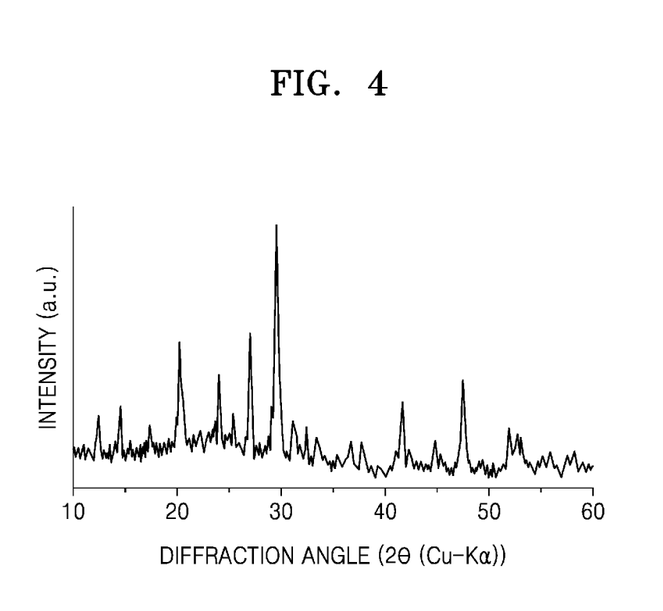
FIG. 4 is a graph of intensity (a.u.) versus diffraction angle ($2\theta°$) using Cu Kα radiation, which shows the results of X-ray diffraction analysis of a solid electrolyte prepared in Example 5, when analyzed using Cu Kα radiation.

FIG. 4 shows the X-ray powder diffraction pattern of the finally obtained solid electrolyte. It was confirmed in FIG. 4 that a crystalline $Li_{10.35}Sn_{0.27}Si_{1.08}P_{1.65}S_{12}$ solid electrolyte having the same crystalline structure of $Li_{10}GeP_2S_{12}$ was formed. In addition, the measured ionic conductivity was $1.1 \times 10^{-3}$ S/cm at a temperature of 25° C., and the measured activation energy was 26 kJ/mol.

Comparative Example 1

In a glove box of which the atmosphere was replaced with Ar gas, $Li_2S$ (purity: 99.9%, Mizuno Japan), $GeS_2$ (purity: 99.9% Wako Pure Chemical), and $P_2S_5$ (purity: 99%, Aldrich) were used to prepare 1.5 g of a powder having a composition of $Li_{10}GeP_2S_{12}$. In a 40 mL beaker, 40 mL of ethanol was prepared as a first solvent. The prepared powder was added and dissolved in ethanol, and the mixed solution was stirred overnight. After completion of the reaction, ethanol was removed therefrom at a temperature of 80° C. under reduced pressure by using a rotary evaporator, so as to obtain a first precursor. 150 mg of the first precursor thus obtained was pressed at a temperature of 380 MPa, so as to prepare a pellet. A quartz glass tube was then vacuum sealed with the pellet, and heat treatment was performed thereon. The heat treatment was performed at a temperature of 550° C. for 3 hours. Following the heat treatment, the resulting pellet was cooled to room temperature, so as to obtain a solid electrolyte.

Figure 5:
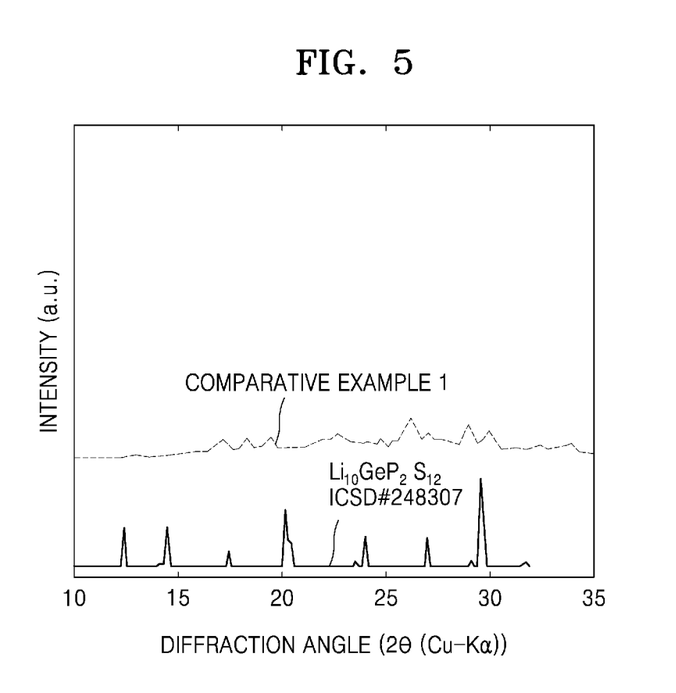
FIG. 5 is a graph of intensity (a.u.) versus diffraction angle ($2\theta°$) using Cu Kα radiation, which shows the results of X-ray diffraction analysis of a solid electrolyte prepared in Comparative Example 1, and a pattern for a reference $Li_{10}GeP_2S_{12}$ (ICSD #248307), when analyzed using Cu Kα radiation.

FIG. 5 shows the X-ray powder diffraction pattern of the finally obtained solid electrolyte. It was confirmed in FIG. 5 that a desired $Li_{10}GeP_2S_{12}$ crystal was not formed. In addition, the measured ionic conductivity was $10^{-6}$ S/cm or less at a temperature of 25° C.

Comparative Example 2

$Li_2S$ (purity: 99.9%, Mizuno Japan), $GeS_2$ (purity: 99.9%, Wako Pure Chemical), and $P_2S_5$ (purity: 99%, Aldrich) were weighed to obtain a desired composition of $Li_{10}GeP_2S_{12}$. Subsequently, the $Li_2S$, $GeS_2$, and $P_2S_5$ starting materials were mixed by mechanical milling for 20 hours in a streamlined ball mill. The mechanical milling was performed at a rotational speed of 380 revolutions per minute (rpm) at room temperature (about 25° C.) in an Ar atmosphere.

Figure 6:
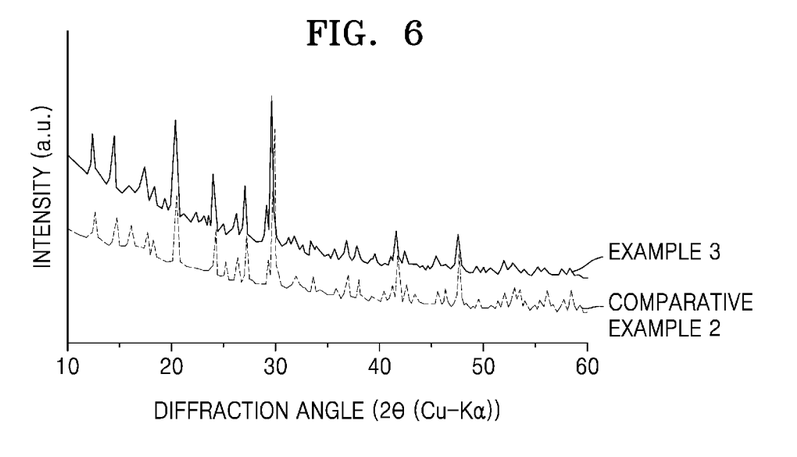
FIG. 6 is a graph of intensity (a.u.) versus diffraction angle ($2\theta°$) using Cu Kα radiation, which shows the results of X-ray diffraction analysis of solid electrolytes prepared in Example 3 and Comparative Example 2 (i.e., a solid electrolyte prepared by a solid-phase method), when analyzed using Cu Kα radiation.

300 mg of a powder sample (e.g., a glassy composite) having a composition of $Li_{10}GeP_2S_{12}$ obtained by the mechanical milling was pressed (at a pressure of 400 megapascals per square centimeter ($MPa/cm^2$)), so as to obtain a pellet having a diameter of 13 millimeters (mm) and a thickness of about 0.8 mm. The pellet thus obtained was covered with gold foil, and additionally added to a carbon crucible, so as to prepare a sample for heat treatment. Then, a quartz glass tube was vacuum sealed with the sample for heat treatment. Subsequently, the sample for heat treatment was put in an electric furnace, and the temperature in the electric furnace was raised at 1.0° C./minute (min) up to 450° C. Then, the heat treatment was performed at 450° C. for 6 hours. Next, the temperature in the electric furnace was cooled at 1.0° C./min down to room temperature, so as to obtain a solid electrolyte body. The collected solid electrolyte body was pulverized in an agate mortar, so as to obtain a sample (i.e., a solid electrolyte) for evaluation. The X-ray crystal diffraction was performed on the obtained solid electrolyte sample, and the results are shown in FIG. 6. In addition, the measured ionic conductivity was $5 \times 10^{-3}$ S/cm at a temperature of 25° C.

According to the summary of the results of Examples 1 to 5 and Comparative Example 1, it was confirmed that the solid electrolyte having the same crystalline structure of the desired $Li_{10}GeP_2S_{12}$ was not able to be prepared in Comparative Example 1 in which the $Li_2S$, $GeS_2$, and $P_2S_5$ starting materials were dissolved in one type of solvent.

It was confirmed that solid electrolyte having the same crystalline structure of the desired $Li_{10}GeP_2S_{12}$ was able to be prepared in Examples 1 to 5 in which the starting material was dissolved on two separate occasions by using the first solvent and the second solvent. In addition, it was confirmed that all the solid electrolytes of Examples 1 to 5 had desirably high ionic conductivity.

In addition, according to the summary of the results of Example 3 and Comparative Example 2, considering that the solid electrolyte of Example 3 prepared by the solution method had an ionic conductivity equivalent to that of the solid electrolyte of Comparative Example 2 prepared by a solid-phase method, it is understood that the solution method disclosed herein may be used to prepare a desirable solid electrolyte.

According to an embodiment, a method of preparing a solid electrolyte may provide an easy and efficient method of preparing a solid electrolyte in a case in which a starting material may be difficult to dissolve in a solvent.

A solid electrolyte having a composition that may be difficult to prepare, e.g., by a liquid-phase method, may be prepared in a large quantity at low cost.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of preparing a solid electrolyte, the method comprising:
    contacting a first solvent and a first starting material comprising an alkali metal, sulfur, phosphorus, an element M, or a combination thereof to form a first solution;
    precipitating a first precursor from the first solution;
    contacting a second solvent, the first precursor, and a second starting material comprising an alkali metal, sulfur, phosphorus, an element M, or a combination thereof to form a second solution;
    wherein the element M comprises an element of Group 14 of the Periodic Table of the Elements,
    wherein when the element M is present in the first starting material and the element M is present in second starting material, the element M in the first starting material and
    the element M in second starting material are the same or different, and wherein the alkali metal in the first starting material and the alkali metal in second starting material are the same or different;
    precipitating a second precursor from the second solution; and
    heat treating the second precursor to prepare the solid electrolyte,
    wherein the first solvent comprises methanol, ethanol, propanol, isopropanol, butanol, acetone, methyl ethyl ketone, butyl acetate, chloroform, acetonitrile, 1,2-dichloroethane, nitroethane, oleic acid, nitrobenzene, benzonitrile, dimethyl sulfoxide, dimethyl acetamide, N-methylformamide, or a combination thereof, and
    wherein the first solvent and the second solvent are different from each other.

2. The method of claim 1, wherein the element M is insoluble in the first solvent or the second solvent.

3. The method of claim 1, wherein the element M is silicon, germanium, or a combination thereof.

4. The method of claim 1, wherein a Gutmann Donor Number of the second solvent is 20 or less.

5. The method of claim 4, wherein the second solvent comprises nitromethane, carbon tetrachloride, chlorobenzene, cyclohexane, hexane, o-xylene, tetrahydrofuran, benzonitrile, 1,4-dioxane, acetonitrile, nitrobenzene, or a combination thereof.

6. The method of claim 1, wherein the heat treating of the second precursor is at a temperature in a range of 500° C. to 600° C.

7. The method of claim 6, wherein the heat treating is performed in a vacuum.

8. The method of claim 1, wherein the first precursor and the second starting material are soluble in the second solvent.

9. The method of claim 1, wherein the precipitating of the first precursor comprises
    adding the first starting material to the first solvent under an inert atmosphere, and
    dissolving the first starting material in the first solvent under the inert atmosphere, and then
    stirring for 10 hours or more.

10. The method of claim 1, wherein the precipitating of the second precursor comprises
    adding the first precursor and the second starting material to the second solvent under an inert atmosphere, and
    dissolving the first precursor and the second starting material in the second solvent under the inert atmosphere, and then
    stirring for 5 days or more.

11. The method of claim 1, wherein the first starting material comprises lithium, sulfur, and germanium, and
    wherein the first solvent does not dissolve the germanium.

12. An all-solid battery comprising:
    a cathode;
    an anode; and
    a solid electrolyte layer disposed between the cathode and the anode,
    wherein the solid electrolyte layer includes a solid electrolyte prepared by the method of claim 1.

13. The all-solid battery of claim 12, wherein the solid electrolyte is represented by Formula 1:

$$A_{10+x}M_{1+x}P_{2-x}S_{12} \qquad \text{Formula 1}$$

wherein, in Formula 1, A comprises an element of Group 1 of the Periodic Table of the Elements,
    M comprises an element of Group 14 of the Periodic Table of the Elements, and
    $0 \leq x < 1$.

14. The all-solid battery of claim 13, wherein A is lithium, sodium, potassium, or a combination thereof.

15. The all-solid battery of claim 13, wherein M comprises silicon, germanium, tin, or a combination thereof.

16. The all-solid battery of claim 13, wherein $0 \leq x \leq 0.5$.

17. The all-solid battery of claim 12, wherein the solid electrolyte has a peak at positions 12.3±0.5° 2θ, 14.3±0.5° 2θ, 17.3±0.5° 2θ, 20.1±0.5° 2θ, 20.4±0.5° 2θ, 23.9±0.5° 2θ, 26.8±0.5° 2θ, 29.4±0.5° 2θ, 36.6±0.5° 2θ, 37.6±0.5° 2θ, 40.9±0.5° 2θ, 41.4±0.5° 2θ, 42.2±0.5° 2θ, 47.3±0.5° 2θ, 51.6±0.5° 2θ, and 52.6±0.5° 2θ, when analyzed by X-ray diffraction using Cu Kα radiation.

18. The method of claim 1, wherein the element M comprises germanium and the first solvent or the second solvent comprises ethanol.

19. A method of preparing a solid electrolyte, the method comprising:
    contacting
        a first solvent and
        a first starting material comprising
            a germanium-containing compound and
            $Li_2S$
    to form a first solution;
    precipitating a first precursor comprising germanium from the first solution;

contacting
a second solvent,
the first precursor comprising germanium, and
a second starting material comprising
Li$_2$S and
P$_2$S$_5$ to form a second solution;
precipitating a second precursor from the second solution; and
heat treating the second precursor to prepare the solid electrolyte,
wherein the solid electrolyte is represented by Formula 1:

Li$_{10+x}$Ge$_{1+x}$P$_{2-x}$S$_{12}$    Formula 1 wherein 0≤x<1,
wherein the first solvent comprises methanol, ethanol, propanol, isopropanol, butanol, acetone, methyl ethyl ketone, butyl acetate, chloroform, acetonitrile, 1,2-dichloroethane, nitroethane, oleic acid, nitrobenzene, benzonitrile, dimethyl sulfoxide, dimethyl acetamide, N-methylformamide, or a combination thereof, and
wherein the first solvent and the second solvent are different from each other.

\* \* \* \* \*